March 8, 1960 R. S. WILLIS 2,927,603
SHUT-OFF VALVE ASSEMBLY FOR WELLS
Filed July 23, 1956 2 Sheets-Sheet 1
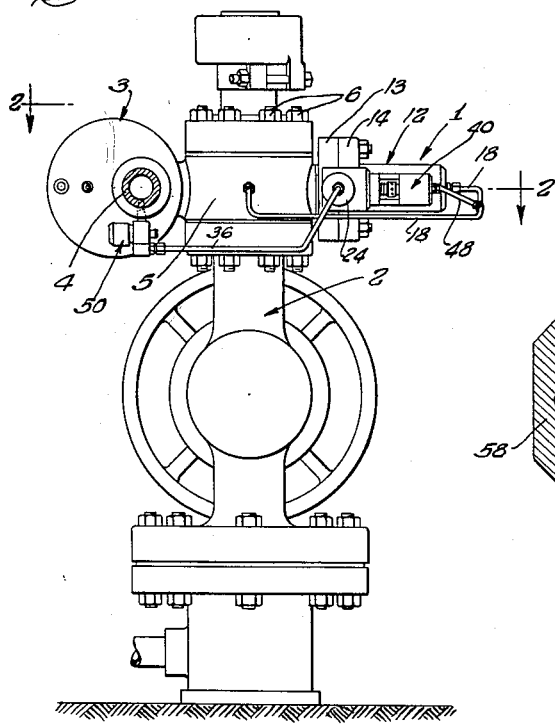
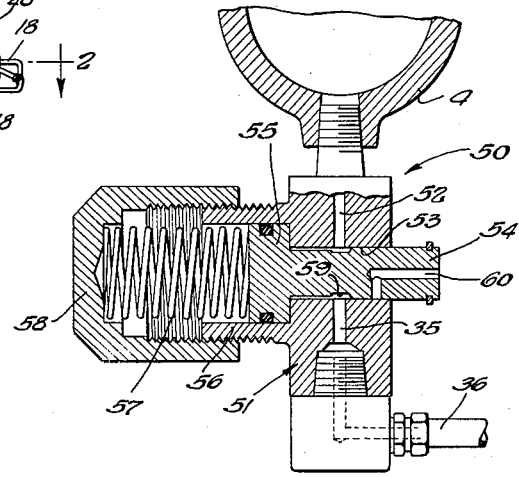
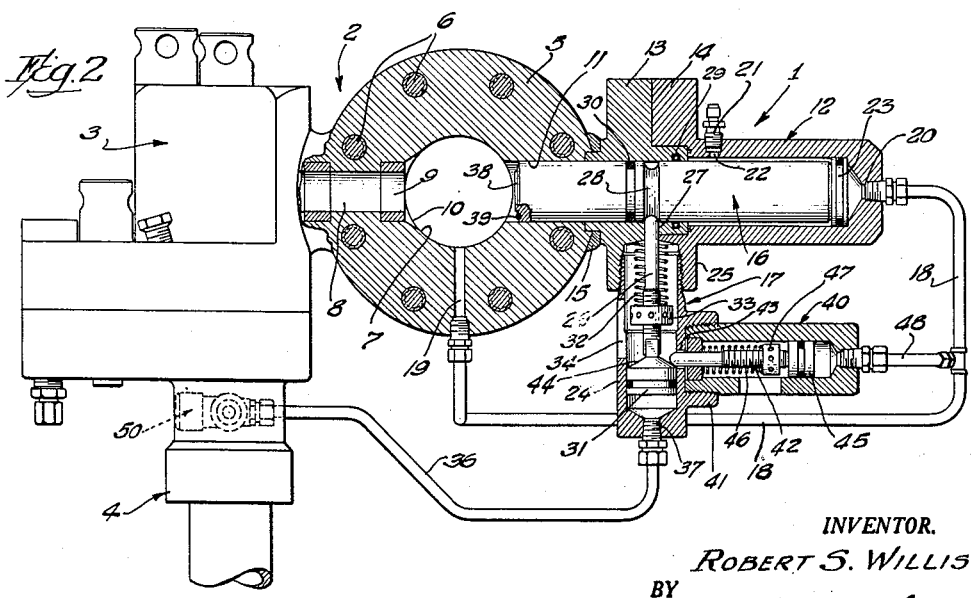
INVENTOR.
ROBERT S. WILLIS
BY
Paul A. Weilein
ATTORNEY.

March 8, 1960 R. S. WILLIS 2,927,603
SHUT-OFF VALVE ASSEMBLY FOR WELLS
Filed July 23, 1956 2 Sheets-Sheet 2
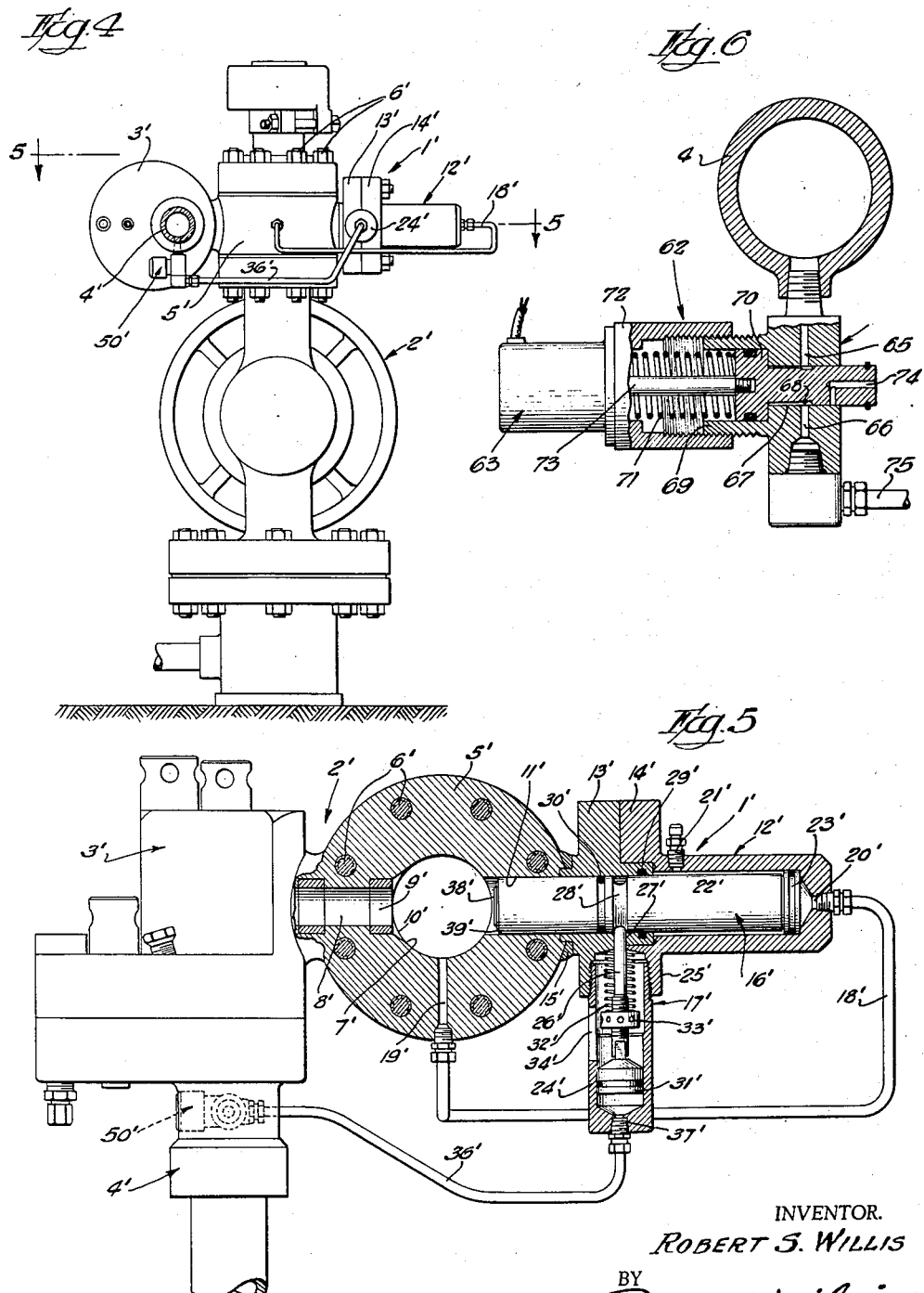
INVENTOR.
ROBERT S. WILLIS
BY
Paul A. Weilein
ATTORNEY.

United States Patent Office 2,927,603
Patented Mar. 8, 1960

2,927,603

SHUT-OFF VALVE ASSEMBLY FOR WELLS

Robert S. Willis, Long Beach, Calif., assignor, by direct and mesne assignments, of ninety-seven and one-half percent to Willis Oil Tool Co., Long Beach, Calif., a corporation of California, and two and one-half percent to Elmer L. Decker, Long Beach, Calif.

Application July 23, 1956, Serial No. 599,396

10 Claims. (Cl. 137—458)

This invention relates to a safety valve assembly for use in connection with wells and associated flow lines, particularly petroleum wells and flow lines connected thereto.

It is an object of this invention to provide an improved safety valve assembly which will stop the flow from a well through a flow line incident to a pressure drop taking place in the line as the result of a break or leak therein.

It is another object of this invention to provide a shut-off valve assembly of the character described which will shut off flow from a well into a flow line responsive to an increase in pressure in the line, such as may be caused by closure of a valve in the line or stoppage of the line.

An additional object thereof is the provision of a safety valve assembly which will shut off flow from a well into a flow line responsive to an increase as well as a decrease of pressure therein beyond a predetermined pressure.

Another object of the invention is the provision of a safety valve assembly which will shut off flow at the top of a well incident an increase of pressure within the well beyond a predetermined pressure.

An additional object is the provision of a safety shut off valve of the character described which is of simple and compact construction such that it may be conveniently installed at the top of a well.

A further object thereof is the provision of a safety valve assembly which upon the development of an excessive pressure in a flow line leading from a well, will vent the effective fluid pressure in the assembly in such a manner that the resultant pressure drop therein will cause the assembly to shut off flow from the well into the flow line.

Another object hereof is the provision for a safety valve unit such as described which may be operated at will at a point or points remote from the well, to shut off flow from the well.

This invention possesses many other advantages and has other objects which may be made more easily apparent from a consideration of the several embodiments of the invention shown in the drawing accompanying and forming part of the present specification. These embodiments will now be described in detail but it is to be understood that this detailed description is not to be taken in a limiting sense, since the scope of the invention is best defined by the appended claims.

Referring to the drawings:

Fig. 1 is an elevational view of a safety shut-off valve assembly embodying the present invention, as it would appear when installed at the top of an oil well.

Fig. 2 is a cross-sectional view taken on the line 2—2 of Fig. 1;

Fig. 3 is a sectional view of a valve unit of the assembly;

Fig. 4 is an elevational view of a modified form of this invention;

Fig. 5 is a cross-sectional view taken on the line 5—5 of Fig. 4; and

Fig. 6 is a fragmentary sectional view of a modified form of the valve unit shown in Fig. 3.

In the accompanying drawings, there are shown three forms of the present invention. One of these forms, as shown in Figs. 1, 2, and 3, embodies means whereby the well flow from the top of the well into a flow line will be shut off incident to a pressure drop as well as a pressure increase in the flow line, also incident to excessive pressure being developed in the well.

Another of the forms of the valve assembly of this invention, as shown in Figs. 4 and 5, provides for shutting off flow from the well to the flow line only when the pressure in the flow line drops below a predetermined pressure. However, this form may also be provided with means whereby a pressure increase in the flow line will vent the effective pressure in the valve assembly so that the resultant pressure drop will cause the assembly to shut off flow from the well into the flow line.

The third form of this invention may be used with the form shown in Figs. 1–3, or the form shown in Figs. 4 and 5, and provides for operation of either form to shut off flow from the well, at the will of an operator, from a point remote from the well.

Each of the forms of the valve assembly of the invention is adapted to be installed as a compact unit in operative association with a well known type of flow regulator known as a flow bean. This flow bean is interposed between the well head and the flow line. The shut-off valve of the valve assembly is operable in the tubular mounting section or base of the flow bean, as this section is in direct communication with the flow passage through the well head, whereby the well flow may be shut off between the well and the flow bean. This combination of the flow bean and the safety valve assembly provides a unit structure that takes up comparatively little space. This is particularly advantageous on small islands, off-shore locations and similar sites where the well heads of a number of wells are closely grouped.

Referring to the form of this invention shown in Figs. 1, 2, and 3, it is seen that it comprises a safety shut-off valve assembly generally designated 1, connected between the head structure 2 of a well and a well known type of flow regulator of flow bean 3. Extending from this flow bean is a flow line 4 for conducting fluid from the well..

In this combination of the flow bean 3 with the safety valve assembly 1, a tubular mounting section or base 5 of the flow bean is also used as the base of the safety valve assembly, thereby providing for a compact flow bean safety valve unit taking up but little space at the top of the well.

The tubular section 5 is secured by means of bolts 6 to the well head 2, with the bore 7 thereof in registry with the usual flow passage leading through the well head into the well. A discharge port 8 extends laterally from the bore 7 through the tubular section 5 for conducting fluid into the flow bean 3, thence into the flow line 4, with the flow regulated according to the flow capacity of the flow bean.

An annular replaceable valve seat 9 is mounted in the inner end of the port 8. The wall of the bore 7 adjacent to the valve seat 9 is relieved as at 10 for the purpose hereinafter described.

Formed in the tubular section 5 so as to be aligned with the port 8, is a valve-receiving bore 11 providing for communication of a valve cylinder 12 with the bore 7. The cylinder 12 is made in two sections 13 and 14, joined in any suitable manner. The section 13 is welded as at 15 to the tubular section 5 so that the bore of the cylinder is in registry with the valve-receiving bore 11. A piston-like valve member 16 is mounted in the cylinder 12 and valve-receiving bore 11, for movement into and out of a position engaging the seat 9 and shutting off flow through the discharge port 8.

As the piston-like valve member 16 is actuated by fluid pressure derived from the well, detent means generally designated 17 is provided to releasably hold the valve member in retracted position permitting free flow from the well through the port 8. The pressure for actuating the valve member 16 is provided through a supply line 18 leading from a port 19 in the tubular section 5 to a port 20 at the outer end of the cylinder 12, thereby subjecting the piston-like valve member 16 to well pressure. The arrangement of the valve member 16 and the seat 9 is such that well pressure will be effective through the line 18 and in the cylinder 12 when the valve 16 is seated as well as unseated.

As a means for retracting the valve member 16 after it has been moved into seated position, a valve fitting 21 is connected to a port 22 intermediate the ends of cylinder 12. Fluid pressure greater than the pressure against the valve member 16 when applied through the valved fitting 21 and port 22 is effective in the cylinder 12 against the sealed head 23 of the valve member to retract the valve member.

The detent means 17 includes a cylinder 24 screwed into a boss 25 on a side of the cylinder 12. A detent pin 26 is reciprocable in the cylinder 24 so as to move through an opening 27 in the cylinder 12 into and from engagement with a groove 28 in the valve member 16, to releasably hold the valve member in retracted position. Sealing rings 29 and 30 are provided on the cylinder 12 and valve 16 respectively. The detent pin 26 is urged into valve-engaging position by means of a piston 31 in the cylinder 24, the piston abutting the outer end of the pin. A spring 32 confined on the pin 26 between the boss 25 and an adjusting screw 33 on the pin 26, urges the pin out of position holding the valve retracted. Adjustment of the nut 33 is effected through a slot 34 in the cylinder 24 to regulate the tension of the spring 32. The piston 31 is actuated by pressure derived from the flow line 4. Such pressure normally maintains the detent pin 26 in contact with the groove 28, thereby holding the valve member 16 retracted. This pressure is applied through a line 36 which is communicated with the flow line 4 in a manner hereinafter described. The line 36 leads to a port 37 in the outer end of cylinder 24. So long as the pressure supplied through the line 36 is greater than the force of the spring 32, the detent pin 26 will hold the valve member 16 retracted. However, should the pressure in the line 4 drop so that the force thereof is less than that of the spring 32, as may be occasioned by a break or leak in the line, or due to any other cause, the spring 32 will retract the pin 26 and release the valve member 16. Upon this release, the fluid pressure from the well entering the cylinder 12 through the line 18, is immediately effective to move the valve member 16 against its seat 9 and thereby shut off flow through the port 8. In this connection, it should be noted that the valve member 16 is provided with a reduced pilot member 38 and a sealing ring 39 adapted to engage the seat 9 whereby the valve will closely seat and shut off flow through the port 8. The relieved portion 10 around the seat 9 assures that the valve member 16 will seat properly.

Means may be provided in this embodiment of the invention for causing the detent pin 26 to release the valve 16 incident to the development of an excessive pressure in the well proper. This means is operated by fluid pressure derived from the well and includes a cylinder 40 connected with a boss 41 on one side of the cylinder 24. A cam pin 42 in the cylinder 40 is extensible through an opening 43 in the wall of the cylinder 24 so as to engage a cam surface 44 on the inner end of the piston 31. A piston 45 is operable in the cylinder 40 to extend the cam pin 42. A coil spring 46 is arranged in the same manner as the spring 32 to retract the pin 42, there being an adjusting nut 47 on the pin, operable in the same manner as the nut 33 for varying the tension of the spring 46.

The fluid pressure for operating the piston 45 is directed into the cylinder 40 through a line 48 connected with the high pressure line 18. With this arrangement, it is seen that in the event a pressure is developed in the well, in excess of the force of the spring 46, this pressure will be effective through the lines 18 and 48 and cylinder 40 against the piston 45, whereby the cam pin 42 will be extended to engage the cam surface 44 and move the piston 31 outwardly, thereby allowing the spring 32 to retract the detent pin 26 and release the valve member 16. In this manner the well is shut off by the valve 16 incident to creation of an excessive pressure in the well proper.

It will now be apparent that one form of the shut-off valve assembly of this invention may, if desired, be provided as here shown with a high pressure means and a low pressure means for actuating the valve member 16 to shut off flow from the well.

Valve means generally designated 50 may also be provided, if desired, in the embodiment of the valve assembly, shown in Figs. 1 and 2, for causing the valve means 16 to shut off flow at the well incident to an increase in pressure in the flow line 4 beyond a predetermined pressure. The valve means 50 operates responsive to such increase in pressure in the line 4, to relieve to the atmosphere pressure in the lines 4 and 36, thereby reducing the pressure in line 36 so that the detent means 17 will release the valve 16 and the latter will be seated by well pressure from the line 18. The valve unit 50 as shown in Fig. 3, includes a valve body 51 having aligned passages 52 and 35 therein. A valve-receiving bore 53 is extended transversely through the body 51 and opens into the aligned passages 52 and 35. A valve member 54 having a piston-like head 55 is operable in the bore 53. The piston-like head 55 is reciprocable in a cylinder 56 extending laterally from the body 51. A spring 57 is confined between the piston-like head 55 and an adjustable screw cap 58 closing the cylinder 56. The force of the spring 57 is regulated by adjusting the cap 58. The spring 57 urges the valve member 54 to a position in which a circumferential groove 59 in the valve member maintains communication of the passages 52 with the passage 35. When the valve member 54 is in this position, a pressure relief port 60 therein is disposed out of communication with the passage 35, thereby permitting an uninterrupted flow into the line 36 which is connected to the body 51 so as to communicate with the passage 35. Should a pressure be developed in the line 4 that is greater than the force of the spring 57, as the latter may be set, this pressure will be effective between the valve member 54 and bore 53 against the piston-like head 55 to move the valve member 54 into a position communicating the relief port 60 with the passage 35 and line 36. This will relieve to the atmosphere the pressure in the cylinder 24, line 36 and passage 35, thereby allowing the spring 32 to retract the detent pin 26 and release the valve member 16 which then seats against seat 9 and shuts off flow from the well.

Another embodiment of this invention, as shown in Figs. 4 and 5, comprises a valve assembly which for some installations may be preferred. This embodiment is identical with the first described embodiment shown in Figs. 1, 2, and 3 except that it omits the high pressure cylinder 40, the flow line 48, cam pin 42 and associated ports. It also may omit a high pressure relief valve such as the valve 50. The parts of this form which correspond to parts shown in Figs. 1 and 2 are identified by the same reference characters as in Figs. 1, 2, and 3, accompanied by the prime character. In some instances, this simplified form may, as here shown, include a pressure relief valve 50' corresponding to the valve 50. If the valve 50' is omitted, the line 36' is connected directly with the flow line 4', instead of communicating with the flow line through the valve 50'.

The third modified form as shown in Fig. 6 provides a high pressure relief valve corresponding to the valve 50, but this valve is subject to operation by an operator remote from the well to shut off the flow from the well. Accordingly, this modified form includes a relief valve unit 62 identical with the valve unit 50 except for the addition thereto of an electrically responsive, remotely controlled actuating means, here shown as solenoid 63. The valve 62 includes a body 64, passages 65 and 66 and a bore 67 arranged on the body in the same manner as shown in Fig. 3.

Also arranged in the same manner as shown in Fig. 3 are a valve member 68, a cylinder 69, piston head 70, spring 71 and a spring adjusting cap 72. The armature 73 of the solenoid 63 is connected to the piston head 70 of the valve member 68 so that when the solenoid is energized, the valve member 68 will be moved to a position communicating the relief port 74 therein with the passage 66. This will vent the line 75 which corresponds to the line 36, so that the resultant pressure drop in the line 75 will cause the valve assembly to which the valve 62 is connected, to shut off flow at the well. In this connection it should be noted that the valve unit 62 may be used in place of the valve units 50 and 50' in either of the two forms of this invention previously described, as it will function responsive to fluid pressure in the same manner as the valve 50, in addition to being subject to remote control.

I claim:

1. A safety shut-off valve assembly for connection with the head of a well having a flow line leading from a passage in said head, comprising: valve means; means for connecting said valve means with said head; a first fluid pressure responsive means operatively connected with said valve means operable to move said valve means into a seated position in said passage to shut off flow into said line; a first conduit means for supplying from said passage, fluid pressure for operating said fluid-pressure responsive means to move said valve means into said seated position; detent means operatively connected with said valve means; a second fluid pressure-responsive means operatively connected with said detent means operable to move said detent means into position for holding said valve means against movement into said seated position; a second conduit means for supplying from said flow line to said second fluid pressure responsive means, a pressure for operating the latter to move said detent means into said holding position; means operatively connected with said detent means operable to move said detent means to release said valve means responsive to a predetermined reduction in pressure in said flow line; and means operatively connected with said flow line and said second conduit means operable when the pressure in said flow line exceeds a predetermined pressure, for venting pressure in said second conduit means whereby said detent means will release said valve means.

2. A safety shut-off valve assembly for connection with the head of a well having a flow line leading from a passage in said head, comprising: valve means; means for connecting said valve means with said head; a first fluid pressure responsive means operatively connected with said valve means operable to move said valve means into a seated position in said passage to shut off flow into said line; a first conduit means for supplying from said passage, fluid pressure for operating said fluid-pressure responsive means to move said valve means into said seated position; detent means operatively connected with said valve means; a second fluid pressure-responsive means operatively connected with said detent means operable to move said detent means into position for holding said valve means against movement into said seated position; a second conduit means for supplying from said flow line to said second fluid pressure responsive means, a pressure for operating the latter to move said detent means into said holding position; means operatively connected with said detent means operable to move said detent means to release said valve means responsive to a predetermined reduction in pressure in said flow line; a third fluid pressure responsive means operatively connected with said second fluid pressure responsive means operable through the latter for moving said detent means to release said valve means; a third conduit means connected with said first conduit means for supplying fluid pressure from said passage for actuating said third fluid-pressure responsive means to effect said release of said valve means; and spring means operatively connected with said third fluid pressure responsive means operable to restrain actuation of said third fluid pressure responsive means until the pressure in said passage exceeds the force of the spring means.

3. A safety shut-off valve assembly for connection with the head of a well having a flow line leading from a passage in said head, comprising: valve means; means for connecting said valve means with said head; a first fluid pressure responsive means operatively connected with said valve means operable to move said valve means into a seated position in said passage to shut off flow into said line; a first conduit means for supplying from said passage, fluid pressure for operating said fluid-pressure responsive means to move said valve means into said seated position; detent means operatively connected with said valve means; a second fluid pressure-responsive means operatively connected with said detent means operable to move said detent means into position for holding said valve means against movement into said seated position; a second conduit means for supplying from said flow line to said second fluid pressure responsive means, a pressure for operating the latter, to move said detent means into said holding position; and means operatively connected with said detent means operable to move said detent means to release said valve means responsive to a predetermined reduction in pressure in said flow line; valve means operatively connected with said flow line and said second conduit movable between a position communicating said flow line with said second conduit means and a position for venting to the atmosphere fluid pressure in said second conduit means; spring means urging said last named valve means into a position for communicating said flow line with said second conduit means; and fluid pressure responsive means operatively connected with said last named valve means operable when the pressure in said flow line exceeds the force of said spring means, for moving said valve means into said venting position.

4. A safety shut-off valve assembly for connection with the head of a well having a flow line for conducting fluid from the flow passage in said head, including: a cylinder; means for connecting said cylinder with said head with the bore of the cylinder in communication with said flow passage; a valve member in said cylinder movable responsive to fluid pressure into a seated position in said flow passage for shutting off flow into said flow line; conduit means for connecting said cylinder with said flow passage to supply fluid under pressure to said cylinder for so moving said valve member; detent means operatively connected to said cylinder; actuating means operatively connected with said detent means operable responsive to fluid pressure for moving said detent means to a position restraining movement of said valve member into said seated position; conduit means for supplying fluid under pressure from said flow line for operating said actuating means; spring means operatively connected with said detent means operable to move said detent means out of said restraining position upon predetermined reduction of fluid pressure against said actuating means; and means operatively connected with said flow line and said last named conduit means operable responsive to a predetermined increase in pressure in said flow line for reducing said fluid pressure against said actuating means whereby said spring means is rendered operable to move said detent means out of said restraining position.

5. A safety shut-off valve assembly for connection with the head of a well having a flow line for conducting fluid from the flow passage in said head, including: a cylinder; means for connecting said cylinder with said head with the bore of the cylinder in communication with said flow passage; a valve member in said cylinder movable responsive to fluid pressure into a seated position in said flow passage for shutting off flow into said flow line; conduit means for connecting said cylinder with said flow passage to supply fluid under pressure to said cylinder for so moving said valve member; detent means operatively connected to said cylinder; actuating means operable responsive to fluid pressure for moving said detent means to a position restraining movement of said valve member into said seated position; releasing means operatively connected with said detent means operable responsive to a predetermined reduction of pressure to which said actuating means is responsive for moving said detent means to release said valve member; conduit means for supplying fluid under pressure from said flow line for operating said actuating means; and valve means connected with said last named conduit means and said flow line operable responsive to a predetermined increase in pressure in said flow line for venting fluid pressure from said last named conduit means and thereby effecting said predetermined pressure reduction at which said valve member is released.

6. A safety shut-off valve assembly for connection with the head of a well having a flow line for conducting fluid from the flow passage in said head, including: a cylinder; means for connecting said cylinder to said head with the bore of the cylinder in communication with said flow passage; a valve member movable in said cylinder into a seated position in said flow passage for shutting off flow into said flow line; conduit means for connecting said cylinder with said flow passage to supply fluid under pressure to said cylinder for so moving said valve member; a detent member operatively connected with said valve member and cylinder operable responsive to fluid pressure for moving said detent member into position restraining movement of said valve member into said seated position; conduit means for supplying fluid under pressure from said flow line for operating said actuating means; releasing means operatively connected with said detent member and said actuating means operable responsive to a predetermined reduction in pressure in said flow line for moving said detent member to release said valve member; and fluid pressure responsive means operatively connected with said first named conduit means and said actuating means operable responsive to a predetermined increase of pressure in said flow passage of the well head for moving said actuating means to withdraw said detent means from said restraining position.

7. A safety shut-off valve assembly for connection with the head of a well having a flow line for conducting fluid from the flow passage in said head, including: a cylinder; means for connecting said cylinder to said head with the bore of the cylinder in communication with said flow passage; a valve member movable in said cylinder into a seated position in said flow passage for shutting off flow into said flow line; a first conduit means for connecting said cylinder with said flow passage to supply fluid under pressure for so moving said valve member; a detent member operatively connected with said cylinder; actuating means operatively connected with said detent member and cylinder operable responsive to fluid pressure for moving said detent member into position restraining movement of said valve member into said seated position; a second conduit means for supplying fluid under pressure from said flow line for operating said actuating means; releasing means operatively connected with said detent member and said actuating means, respectively, operable responsive to a predetermined reduction in pressure in said flow line for moving said detent member to release said valve member; fluid pressure responsive means operatively connected with said first named conduit means and said actuating means operable responsive to a predetermined increase pressure in said flow passage for moving said actuating means to withdraw said detent means from said restraining position; and fluid pressure responsive valve means connected with said second named conduit means and said flow line operable responsive to a predetermined increase in pressure in said flow line for venting fluid pressure from said second conduit means and thereby effecting said predetermined pressure reduction at which said releasing means is operable for releasing said valve member.

8. A safety shut-off valve assembly for a well comprising: a tubular section for connection in flow receiving relationship with a flow passage in the top of a well; said section having a discharge port for connecting said passage with a flow line; a valve seat in said port; said section having a valve-receiving bore; a first cylinder connected to said section with the bore thereof in registration with said valve-receiving bore; a valve member operable as a piston in said cylinder and valve receiving bore for engaging said seat to shut off flow through said port; conduit means for supplying fluid pressure from said flow passage to said cylinder for urging said valve member against said seat; a second cylinder operatively connected with said cylinder; conduit means for supplying fluid under pressure from said flow line to said second cylinder; said first cylinder having an opening therein; a detent member operable in the said second cylinder and said opening for restraining movement of said valve member toward said seat; a piston in said second cylinder operable responsive to fluid pressure for holding said detent member in position restraining said movement of said valve member; releasing means in said second cylinder operable responsive to a predetermined variation of pressure in said flow line for moving said detent member to release said valve member; and fluid pressure responsive means connected with said first named conduit and said second cylinder, respectively, operating responsive to a predetermined increase of pressure within the well for moving said actuating means and said detent means to release said valve member.

9. A safety shut-off valve assembly for a well comprising: a tubular section for connection in flow-receiving relationship with a flow passage in the top of a well; said section having a discharge port for connecting said passage with a flow line; a valve seat in said port; said section having a valve-receiving bore; a first cylinder connected to said section with the bore thereof in registration with said valve-receiving bore; a valve member operable as a piston in said cylinder and valve-receiving bore for engaging said seat to shut off flow through said port; a first conduit means for continuously supplying to said first cylinder from said passage fluid pressure capable of moving said valve member against said seat; said first cylinder having an opening therein; a second cylinder operatively connected with said first cylinder; a detent member movable in said second cylinder through said opening into a position for engaging and holding said valve member against movement toward said seat; actuating means operable in said second cylinder responsive to fluid pressure for moving said detent member; a second conduit means for supplying fluid under pressure from said line to said second cylinder for operating said actuating means to move said detent member into said holding position; spring means in said second cylinder operable for moving said detent member out of said holding position responsive to reduction of fluid pressure in said second conduit means; a third cylinder connected with said second cylinder; said second cylinder having an opening therein; a cam member movable in said third cylinder through said opening in said second cylinder for engaging and moving said actuating means in said second cylinder in a direction for withdrawing said detent member from said holding position; a piston operable in said third cylinder for so moving said cam member; spring means in said third cylinder resisting said movement of said piston in said third cylinder; and conduit means for supplying fluid under pressure from said passage to said third cylinder for so moving the piston in the latter.

10. A safety shut-off valve assembly for a well comprising: a tubular section for connection in flow-receiving relationship with a flow passage in the top of a well; said section having a discharge port for connecting said passage with a flow line; a valve seat in said port; said section having a valve-receiving bore; a first cylinder connected to said section with the bore thereof in registration with said valve-receiving bore; a valve member operable as a piston in said cylinder and valve-receiving bore for engaging said seat to shut off flow through said port; a first conduit means for continuously supplying to said first cylinder from said passage fluid pressure capable of moving said valve member against said seat; said first cylinder having an opening therein; a second cylinder operatively connected with said first cylinder; a detent member movable in said second cylinder through said opening into a position for engaging and holding said valve member against movement toward said seat; actuating means operable in said second cylinder responsive to fluid pressure for moving said detent member; a second conduit means for supplying fluid under pressure from said line to said second cylinder for operating said actuating means to move said detent member into said holding position; spring means in said second cylinder operable for moving said detent member out of said holding position responsive to reduction of fluid pressure in said second conduit means; valve means communicating with said second conduit means and said flow line operable responsive to an increased pressure in said flow line above a predetermined pressure, for venting pressure from said second conduit means whereby said spring means will operate to move said detent member out of said holding position.

References Cited in the file of this patent

UNITED STATES PATENTS

| | | |
|---|---|---|
| 811,588 | Schneider | Feb. 6, 1906 |
| 2,202,313 | Grove | May 28, 1940 |
| 2,243,711 | Lamb | May 27, 1941 |
| 2,270,304 | Jacobsson | Jan. 20, 1942 |
| 2,620,820 | Born | Dec. 9, 1952 |
| 2,638,928 | Stadler | May 19, 1953 |
| 2,707,484 | Rush | May 3, 1955 |